(12) United States Patent
Ziolek et al.

(10) Patent No.: US 9,362,704 B2
(45) Date of Patent: Jun. 7, 2016

(54) LASER RESONATOR FOR GENERATING FREQUENCY-CONVERTED LASER RADIATION

(75) Inventors: Carsten Ziolek, Seewis Dorf (CH); Sven Joosten, Fideris (CH); Dietmar Kruse, Malans (CH)

(73) Assignee: Trumpf Laser Marking Systems AG, Gruesch (CH)

( * ) Notice: Subject to any disclaimer, the term of this patent is extended or adjusted under 35 U.S.C. 154(b) by 0 days.

(21) Appl. No.: 14/116,444

(22) PCT Filed: Apr. 25, 2012

(86) PCT No.: PCT/EP2012/057512
§ 371 (c)(1),
(2), (4) Date: Feb. 18, 2014

(87) PCT Pub. No.: WO2012/152583
PCT Pub. Date: Nov. 15, 2012

(65) Prior Publication Data
US 2014/0198813 A1    Jul. 17, 2014

(30) Foreign Application Priority Data

May 9, 2011    (EP) .................... 11165298

(51) Int. Cl.
*H01S 3/10*    (2006.01)
*H01S 3/00*    (2006.01)
(Continued)

(52) U.S. Cl.
CPC ........... *H01S 3/0092* (2013.01); *H01S 3/08072* (2013.01); *H01S 3/109* (2013.01); *H01S 3/061* (2013.01); *H01S 3/08059* (2013.01); *H01S 3/117* (2013.01); *H01S 3/1611* (2013.01)

(58) Field of Classification Search
CPC ............. H01S 3/08009; H01S 3/0805; H01S 3/08054; H01S 3/10046; H01S 3/1024; H01S 3/108; H01S 3/109; H01S 3/1106; H01S 3/14; H01S 3/0092; H01S 3/08072; H01S 3/061; H01S 3/08059; H01S 3/117; H01S 3/1611
USPC .......................................................... 372/22
See application file for complete search history.

(56) References Cited

U.S. PATENT DOCUMENTS 4,637,026 A    1/1987    Liu
4,885,752 A    12/1989    Chien et al.
(Continued)

FOREIGN PATENT DOCUMENTS

DE    10003244 A1    8/2000
FR    2788893 A1    7/2000
(Continued)

OTHER PUBLICATIONS

Pask H. M. et al: "Wavelength-versatile visible and UV sources based on crystalline Raman lasers", Progress in Quantum Electronics, Pergamon Press, Oxford, GB, Bd. 32, Nr. 3-4, Jan. 1, 2008, Seiten 121-158, XP025694851, ISSN: 0079-6727, DOI: 10.1016/J. PQUANTELEC.2008.09.001 [gefunden am Sep. 25, 2008] Zusammenfassung; Abbildung 1c.

(Continued)

*Primary Examiner* — Xinning Niu
*Assistant Examiner* — Vu A Vu
(74) *Attorney, Agent, or Firm* — Fish & Richardson P.C.

(57) ABSTRACT

The invention relates to a laser resonator for generating frequency-converted laser radiation, comprising a laser-active solid-state medium and a wavelength conversion crystal. A transmissive optical element having a concavely curved surface for generating collimated laser radiation is arranged in the laser resonator.

20 Claims, 2 Drawing Sheets

(51) Int. Cl.
*H01S 3/08* (2006.01)
*H01S 3/109* (2006.01)
*H01S 3/117* (2006.01)
*H01S 3/16* (2006.01)
*H01S 3/06* (2006.01)

(56) References Cited

U.S. PATENT DOCUMENTS

| | | | |
|---|---|---|---|
| 5,101,415 A * | 3/1992 | Kolb et al. | 372/99 |
| 5,130,997 A | 7/1992 | Ortiz et al. | |
| 5,173,799 A * | 12/1992 | Tanuma | 359/326 |
| 5,255,275 A | 10/1993 | Motegi | |
| 5,675,593 A * | 10/1997 | Oka | H01S 3/1312 372/21 |
| 5,757,827 A * | 5/1998 | Makio et al. | 372/22 |
| 5,790,574 A * | 8/1998 | Rieger et al. | 372/25 |
| 5,809,048 A * | 9/1998 | Shichijyo et al. | 372/32 |
| 5,838,709 A * | 11/1998 | Owa | 372/68 |
| 6,130,902 A * | 10/2000 | Shimoji | 372/34 |
| 6,282,223 B1 | 8/2001 | Angeley | |
| 7,145,731 B2 * | 12/2006 | Chang et al. | 359/689 |
| 7,394,841 B1 * | 7/2008 | Konttinen et al. | 372/45.013 |
| 2008/0259986 A1 * | 10/2008 | Kimura et al. | 372/70 |
| 2008/0304393 A1 * | 12/2008 | Shibuya | C08K 5/3435 369/112.01 |
| 2009/0219958 A1 | 9/2009 | Mizushima et al. | |
| 2010/0002731 A1 * | 1/2010 | Kimura et al. | 372/10 |
| 2010/0103961 A1 * | 4/2010 | Yamazoe | 372/18 |
| 2010/0254417 A1 * | 10/2010 | Gollier et al. | 372/26 |
| 2010/0309438 A1 * | 12/2010 | Mizushima et al. | 353/31 |

FOREIGN PATENT DOCUMENTS

| | | |
|---|---|---|
| JP | 53103395 | 9/1978 |
| JP | 1128484 | 5/1989 |
| JP | 2012981 A | 1/1990 |
| JP | 02191386 A | 7/1990 |
| JP | 385779 | 4/1991 |
| JP | 3233986 A | 10/1991 |
| JP | 2000216465 | 8/2000 |
| JP | 2001320114 A | 11/2001 |
| JP | 2003008121 A | 1/2003 |
| JP | 2004319563 | 11/2004 |
| JP | 2005148550 | 6/2005 |
| JP | 2008244212 | 10/2008 |
| WO | 2005083851 A2 | 9/2005 |

OTHER PUBLICATIONS

Ren Z et al: "532nm laser based on V-type doubly resonant intracavity frequency-doubling", Optics Communications, North-Holland Publishing Co. Amsterdam, NL, Bd. 282, Nr. 2, Jan. 15, 2009, Seiten 263-266, XP025694524, ISSN: 0030-4018, DOI: 10.1016/J.OPTCOM.2008.09.033 [gefunden am Nov. 26, 2008] Zusammenfassung: Abbildung 2.
International Search Report dated Jun. 12, 2012.
International Preliminary Report on Patentability and English translation dated Nov. 21, 2013.

* cited by examiner

LASER RESONATOR FOR GENERATING FREQUENCY-CONVERTED LASER RADIATION

This application is a national stage application of International Application No. PCT/EP2012/057512 (WO 2012/152583 A1), filed Apr. 25, 2012 which is herein incorporated by reference in its entirety.

BACKGROUND

1. Field of the Invention

The present invention relates to a laser resonator for generating frequency-converted laser radiation, comprising: a laser-active solid-state medium and a wavelength conversion crystal.

2. Background

Laser resonators for the resonator-internal generation of frequency-converted laser radiation typically have a wavelength conversion crystal within the laser resonator, in which wavelength conversion crystal laser radiation generated at a fundamental frequency or wavelength in a laser-active medium is converted into laser radiation having a typically higher frequency. Wavelength conversion crystals used include nonlinear crystals, for example LBO crystals, which produce a frequency conversion from the fundamental frequency to a higher harmonic, e.g. to the second or third harmonic. For a sufficiently high efficiency of the frequency conversion, in this case a high beam intensity is required in the nonlinear crystal.

In order to generate a sufficiently high beam intensity in the wavelength conversion crystal, it is known to design the beam path of the laser resonator such that the wavelength conversion crystal is arranged in the region of a beam waist. In order to generate a beam waist having a minimum beam diameter, it is possible, for example, for the end mirror adjacent to the wavelength conversion crystal to be embodied in a concave fashion, as illustrated in DE 100 03 244 A1. As likewise described therein, the concave end mirror increases the length of the laser resonator, such that the latter cannot be realized in a compact design. Therefore, DE 100 03 244 A1 suggests using a convex end mirror instead of a concave end mirror, in order thereby to shorten the resonator length and additionally to increase the stability of the laser resonator.

SUMMARY

The object of the present invention is to provide a laser resonator of the type mentioned in the introduction which enables an efficient frequency conversion in conjunction with a compact design.

This object is achieved by means of a laser resonator as described above in which a transmissive optical element having a concavely curved surface for generating collimated laser radiation is arranged. The transmissive optical element makes it possible to generate a collimated laser beam having a minimum beam diameter in the laser resonator, which is reflected back on itself at a planar boundary surface of the laser resonator. In this way, it is possible to realize a laser resonator having a compact design since the generation of a beam waist (intermediate focus) can be dispensed with. In particular, in this case the wavelength conversion crystal can be arranged in the vicinity of the planar boundary surface of the laser resonator, on which the collimated radiation impinges in order to increase the beam intensity in the nonlinear medium and thus the efficiency of the frequency conversion. The wording "in the vicinity of the boundary surface" is understood in this case to mean that the wavelength conversion crystal is arranged nearer to that boundary surface of the laser resonator on which the laser radiation collimated by the transmissive optical element impinges than to a second mirror surface delimiting the laser resonator at the opposite end.

In one embodiment, the transmissive optical element is arranged adjacent to a planar end mirror of the laser resonator, that is to say that no further beam shaping element is situated between the transmissive optical element and the planar end mirror. This ensures that the collimated laser beam impinges on the planar end mirror and can be reflected back on itself at the latter.

In an alternative embodiment, the transmissive optical element has a further, planar surface having a highly reflective coating delimiting the laser resonator on the end side. The reflective coating replaces the planar end mirror and thus enables a particularly compact design of the laser resonator.

In a further embodiment, the transmissive optical element is a diverging lens. In this case, the lens surface facing away from the planar end mirror or the highly reflective coating is embodied in a concave fashion in order to compensate for the thermal lens produced by the laser-active solid-state medium. In this case, the focal length of the diverging lens is defined in a manner dependent on the dimensioning of the laser resonator such that a good beam quality can be obtained. In this case, the diverging lens can be arranged between the wavelength conversion crystal and the end mirror or a reflective coating on the end side.

Alternatively, it is also possible to arrange the diverging lens between the laser-active solid-state medium and the wavelength conversion crystal. In this case, the wavelength conversion crystal is arranged in the collimated beam path between the diverging lens and the end mirror or the reflective coating on the end side, i.e. in the region of the resonator with a minimum beam diameter.

In an alternative embodiment, the transmissive optical element is the wavelength conversion crystal, i.e. a side surface of the wavelength conversion crystal has a concave curvature. Wavelength conversion crystals having (convexly) curved surfaces are described for example in US2009/0219958 and are used therein for reflecting laser radiation having the fundamental frequency repeatedly in the nonlinear wavelength conversion crystal. In contrast thereto, in the case of the present invention, the concavely curved surface is used for collimating the laser radiation in the wavelength conversion crystal and obtaining a minimum beam diameter in this way.

In one embodiment, the laser resonator has a (further) planar end mirror, i.e. the laser resonator is delimited by two planar mirror surfaces. A collimated laser beam is likewise reflected back on itself at the planar end mirror, said collimated laser beam having a larger diameter than the collimated laser beam in the region of the other end—adjacent to the wavelength conversion crystal—of the laser resonator. In this case, the (further) planar end mirror is typically arranged adjacent to the laser-active solid-state medium, i.e. no further beam shaping element is arranged between the planar end mirror and the solid-state medium.

In one embodiment, the laser resonator has a quality modulation element in order to generate pulsed laser radiation. An acousto-optical modulator or, if appropriate, an electro-optical modulator, for example a Pockels cell, can be used as quality modulation element. It goes without saying that a quality modulation element can also be dispensed with, for example if the laser resonator is intended to be operated in the "continuous wave" mode.

In a further embodiment, the laser resonator comprises a coupling-out mirror for coupling out the frequency-converted laser radiation from the laser resonator. The coupling-out mirror is typically a dichroic mirror, i.e. a mirror which transmits radiation at a first wavelength, e.g. at the fundamental frequency, and reflects radiation at a second wavelength, e.g. at the higher harmonic (or vice versa).

Further advantages of the invention are evident from the description and the drawing. The features mentioned above and as presented further below can likewise be used in each case by themselves or as a plurality in arbitrary combinations. The embodiments shown and described should not be understood as an exhaustive enumeration, but rather are of exemplary character for describing the invention.

DETAILED DESCRIPTION

Figure 1A:
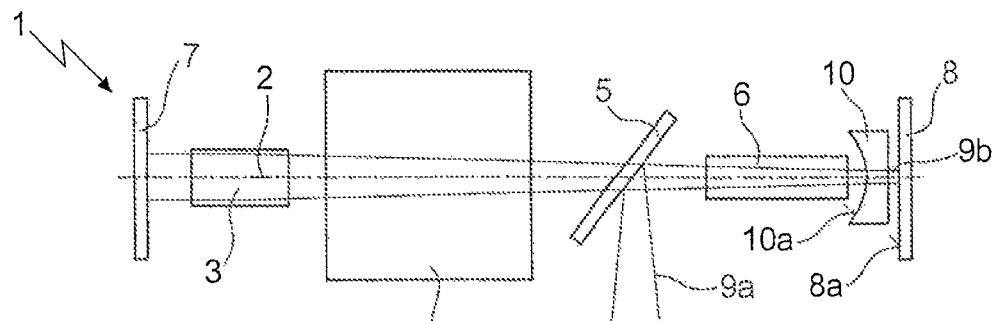
FIGS. 1a, b show schematic illustrations of two embodiments of a laser resonator according to the invention comprising a diverging lens for collimating laser radiation, FIGS. 2a,b show schematic illustrations of two further embodiments of the laser resonator comprising a diverging lens, in which embodiments a wavelength conversion crystal is arranged in the collimated beam path, and FIGS. 3a, b show schematic illustrations of two further embodiments of the laser resonator comprising a wavelength conversion crystal for collimating laser radiation.

FIG. 1a shows a laser resonator 1 comprising, in sequence between two planar end mirrors 7, 8 along an optical axis 2, a rod-shaped laser-active solid-state medium 3, a quality modulation element 4, a coupling-out mirror 5 and a wavelength conversion crystal 6. The laser radiation excited in the laser medium 3 by a pump light source (not shown) with a fundamental frequency is frequency-converted at the wavelength conversion crystal 6 and coupled out from the laser resonator 1 as frequency-converted laser radiation 9a via the dichroic coupling-out mirror 5, which is oriented at 45° with respect to the optical axis 2 of the laser resonator 1.

The laser medium 3 can be, for example, an Nd:VYO$_4$ crystal or an Nd:YAG crystal. The wavelength conversion crystal 6 is a nonlinear crystal, e.g. in the form of a lithium triborate (LiB$_3$O$_5$) crystal, which generates frequency-converted laser radiation at the second harmonic of the fundamental frequency. An acousto-optical modulator, or, if appropriate, an electro-optical modulator, for example a Pockels cell, can be used as quality modulation element 4.

In order to obtain an efficient frequency conversion in the laser resonator 1, it is of advantage to generate the highest possible beam intensity in the nonlinear wavelength conversion crystal 6. For this purpose, the wavelength conversion crystal 6 should be arranged in a region of the laser resonator 1 in which the diameter of the laser beam is as small as possible.

In the case of the laser resonator 1 shown in FIG. 1a, the solid-state medium 3 is arranged in the region of the first end mirror 7 or adjacent thereto. In this case, the active solid-state medium 3 generates a thermal lens, such that the beam diameter decreases in the region of the second end mirror 8, which is further away from the laser medium 3. The wavelength conversion crystal 6 should therefore be arranged as near as possible to the second end mirror 8 in order to obtain the highest possible laser intensity in the nonlinear medium.

However, it is necessary to compensate for the thermal lens of the solid-state medium 3, which is achieved by means of a diverging lens 10 arranged between the wavelength conversion crystal 6 and the second, planar end mirror 8. The diverging lens 10 has a concavely curved lens surface 10a in order to generate collimated laser radiation 9b having a minimum beam diameter. This laser radiation 9b impinges on the planar end mirror 8 and is reflected back on itself by the latter.

The generation of the collimated laser radiation 9b makes it possible to generate a high radiation intensity in the wavelength conversion crystal 6 without the length of the laser resonator 1 having to be increased for this purpose. Through a suitable choice of the focal length of the diverging lens 10, in this case it is possible at the same time to obtain a high beam quality of the laser radiation in the laser resonator 1.

Figure 1B:
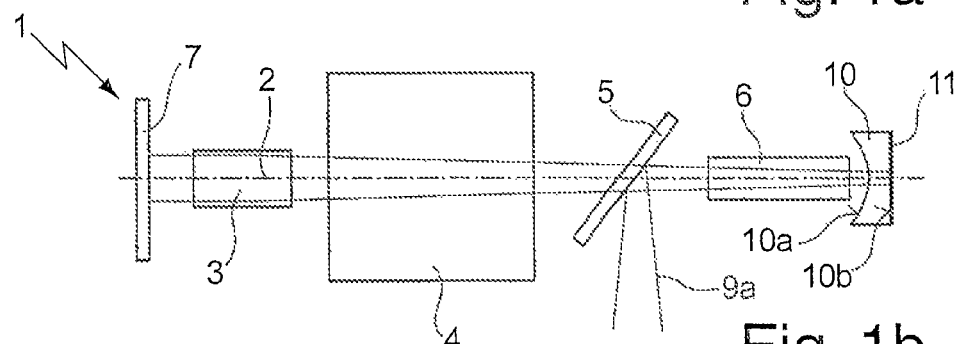

A particularly compact configuration of the laser resonator 1 is shown in FIG. 1b, where, instead of the second planar end mirror 8, a highly reflective coating 11 is applied to a planar surface 10b of the diverging lens 10. The reflective coating 11 thus delimits the laser resonator 1 on the end side. This additionally has the advantage that fewer components, which can become misaligned, are contained in the construction and the laser resonator 1 thus becomes stabler.

Figure 2A:
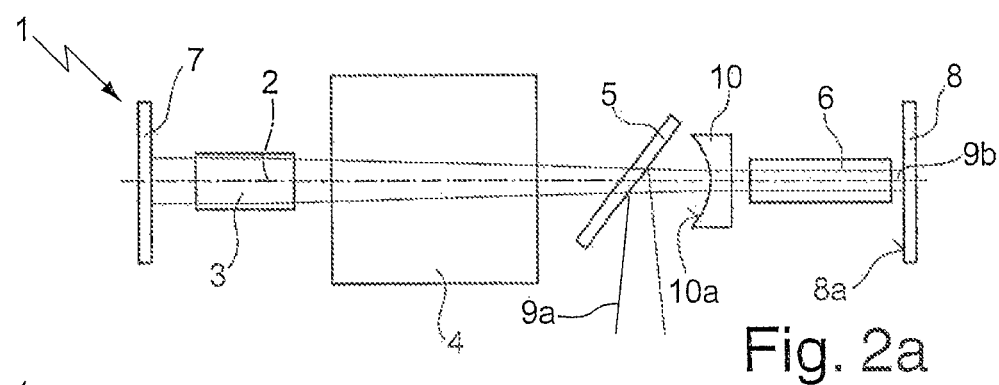
Figure 2B:
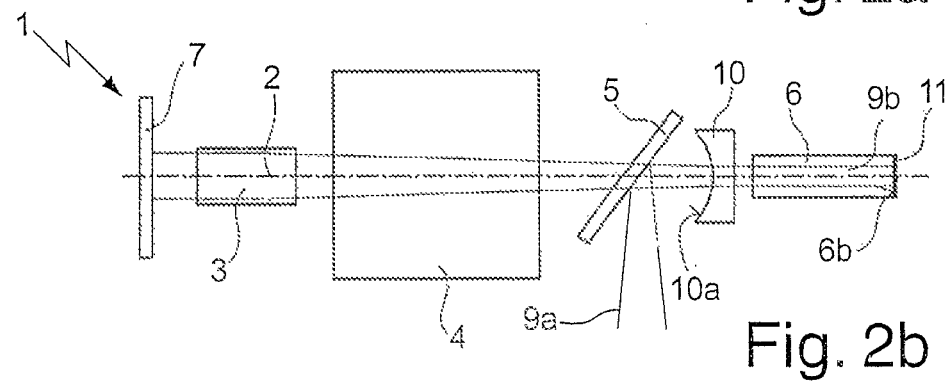

In order to arrange the wavelength conversion crystal 6 in a region with a minimum beam diameter, alternatively the diverging lens 10 can also be arranged on that side of the wavelength conversion crystal 6 which faces away from the end mirror 8, as is illustrated in FIG. 2a. In this case, the wavelength conversion crystal 6 is arranged completely in the collimated beam path with a minimum beam cross section, such that the wavelength conversion can take place particularly effectively. In order to delimit the laser resonator 1 on the end side, analogously to FIG. 1b, a planar surface 6b of the wavelength conversion crystal 6 can be provided with a reflective coating 11, such that the end mirror 8 can be dispensed with (cf. FIG. 2b).

Figure 3A:
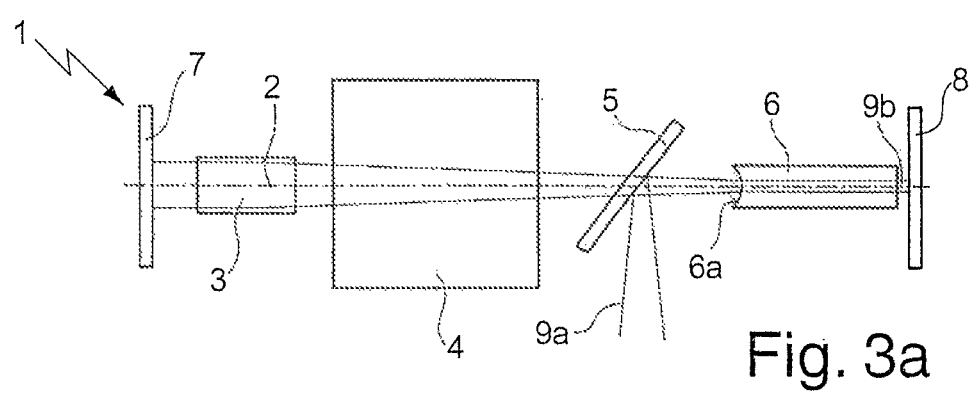

Alternatively, the wavelength conversion crystal 6 itself can also be provided with a concavely curved (lens) surface 6a in order to generate collimated laser radiation 9b, as is shown in FIG. 3a. What can be achieved in this way is that the laser radiation has a minimum beam cross section and thus a maximum radiation intensity over the entire length of the wavelength conversion crystal 6, such that the wavelength conversion can be carried out particularly effectively.

Figure 3B:
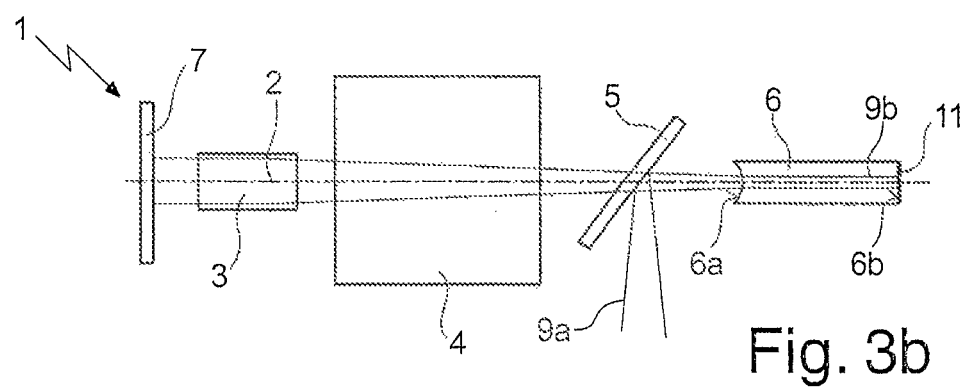

In the case of the example of the laser resonator 1 show in FIG. 3a, too, the second end mirror 8 can be replaced by a highly reflective coating 11 on a planar end surface 6b of the wavelength conversion crystal 6, as is illustrated in FIG. 3b. As in FIG. 1b, in this way the laser resonator 1 can be realized in a particularly compact design.

It goes without saying that, instead of a single laser-active solid-state medium 3, two or more laser-active solid-state media can also be provided in the laser resonator. In this case, by way of example, a phase matching element can additionally be arranged in the laser resonator, said phase matching element rotating the plane of polarization e.g. by 90° in order to compensate for the birefringence of the solid-state media. Additional optical elements, e.g. folding mirrors, can also be arranged in the laser resonator 1.

What is claimed is:

1. A laser resonator for generating frequency-converted laser radiation, comprising:
   a laser-active solid-state medium;
   a wavelength conversion crystal; and
   two planar boundary surfaces delimiting the laser resonator, wherein, during operation, convergent laser radiation is excited in the laser-active solid-state medium and exits the laser-active solid state medium in a convergent manner, wherein a transmissive optical element is arranged in the laser resonator and has a concavely curved surface configured to compensate for a thermal lens generated by the laser-active solid-state medium and to collimate the convergent laser radiation that passes through the concavely curved surface into the transmissive optical element and is reflected back on itself at one of the planar boundary surfaces, wherein the laser radiation collimated by the transmissive optical element has a minimum beam diameter in the laser resonator, and wherein the wavelength conversion crystal is configured to convert the laser radiation in the wavelength conversion crystal to the frequency-converted laser radiation.

2. The laser resonator as claimed in claim 1, wherein the transmissive optical element is arranged adjacent to a planar end mirror of the laser resonator.

3. The laser resonator as claimed in claim 1, wherein a further, planar surface of the transmissive optical element has a reflective coating delimiting the laser resonator on an end side of the laser resonator, and wherein the planar surface of the transmissive optical element is the one of the planar boundary surfaces.

4. The laser resonator as claimed in claim 1, wherein the transmissive optical element is a diverging lens.

5. The laser resonator as claimed in claim 4, wherein the diverging lens is arranged between the laser-active solid-state medium and the wavelength conversion crystal.

6. The laser resonator as claimed in claim 1, wherein the wavelength conversion crystal comprises the transmissive optical element.

7. The laser resonator as claimed in claim 1, further comprising:
a planar end mirror arranged adjacent to the laser-active solid-state medium.

8. The laser resonator as claimed in claim 1, further comprising:
a quality modulation element.

9. The laser resonator as claimed in claim 1, further comprising:
a coupling-out mirror for coupling out the frequency-converted laser radiation from the laser resonator.

10. The laser resonator as claimed in claim 1, wherein the wavelength conversion crystal is configured to convert the laser radiation transmitted through the transmissive optical element to the frequency-converted laser radiation.

11. A laser resonator comprising:
a laser-active solid-state medium;
a wavelength conversion crystal;
two planar boundary surfaces delimiting the laser resonator; and
a transmissive optical element,
wherein, during operation, convergent laser radiation is excited in the laser-active solid-state medium and exits the laser-active solid state medium in a convergent manner,
wherein the transmissive optical element has a concavely curved surface configured to compensate for a thermal lens generated by the laser-active solid-state medium and to collimate the convergent laser radiation that passes through the concavely curved surface into the transmissive optical element and is reflected back on itself at one of the planar boundary surfaces,
wherein the laser radiation collimated by the transmissive optical element has a minimum beam diameter in the laser resonator, and
wherein the wavelength conversion crystal is configured to convert the laser radiation in the wavelength conversion crystal to frequency-converted laser radiation.

12. The laser resonator as claimed in claim 11, wherein the transmissive optical element is arranged adjacent to a planar end mirror of the laser resonator.

13. The laser resonator as claimed in claim 11, wherein a further, planar surface of the transmissive optical element has a reflective coating delimiting the laser resonator on an end side of the laser resonator, and wherein the planar surface of the transmissive optical element is the one of the planar boundary surfaces.

14. The laser resonator as claimed in claim 11, wherein the transmissive optical element is a diverging lens.

15. The laser resonator as claimed in claim 14, wherein the diverging lens is arranged between the laser-active solid-state medium and the wavelength conversion crystal, such that the wavelength conversion crystal is in a propagating path of the collimated laser radiation.

16. The laser resonator as claimed in claim 11, further comprising at least one of:
a planar end mirror arranged adjacent to the laser-active solid-state medium,
a quality modulation element, or
a coupling-out mirror for coupling out the frequency-converted laser radiation from the laser resonator.

17. A laser resonator comprising:
a laser-active solid-state medium;
two planar boundary surfaces delimiting the laser resonator; and
a wavelength conversion crystal positioned between the two planar boundary surfaces,
wherein, during operation, convergent laser radiation is excited in the laser-active solid-state medium and exits the laser-active solid state medium in a convergent manner,
wherein the wavelength conversion crystal has a concavely curved surface configured to compensate for a thermal lens generated by the laser-active solid-state medium and to collimate the convergent laser radiation that passes through the concavely curved surface into the wavelength conversion crystal and is reflected back on itself at one of the planar boundary surfaces,
wherein the laser radiation collimated by the wavelength conversion crystal has a minimum beam diameter in the laser resonator, and
wherein the wavelength conversion crystal is configured to convert the laser radiation in the wavelength conversion crystal to frequency-converted laser radiation.

18. The laser resonator as claimed in claim 17, wherein the wavelength conversion crystal is optically transmissive and configured to be a diverging lens.

19. The laser resonator as claimed in claim 17, wherein a further, planar surface of the wavelength conversion crystal has a reflective coating delimiting the laser resonator on an end side of the laser resonator, wherein the planar surface of the wavelength conversion crystal is the one of the planar boundary surfaces, and wherein the planar surface faces away from the concavely curved surface.

20. The laser resonator as claimed in claim 17, further comprising at least one of:
a planar end mirror arranged adjacent to the laser-active solid-state medium,
a quality modulation element, or
a coupling-out mirror for coupling out the frequency-converted laser radiation from the laser resonator.

* * * * *